(12) United States Patent
Javangula et al.

(10) Patent No.: US 7,246,084 B1
(45) Date of Patent: Jul. 17, 2007

(54) APPROACH FOR PROCESSING ELECTRONIC ORDERS

(75) Inventors: Pradeep Javangula, San Jose, CA (US); Norbert Hendrikse, Berkeley, CA (US); Sailendra K. Padala, San Mateo, CA (US)

(73) Assignee: E-centives, Inc., Bethesda, MD (US)

( * ) Notice: Subject to any disclaimer, the term of this patent is extended or adjusted under 35 U.S.C. 154(b) by 558 days.

(21) Appl. No.: 09/713,135

(22) Filed: Nov. 14, 2000

(51) Int. Cl.
*G06Q 30/00* (2006.01)

(52) U.S. Cl. .......................................... 705/26; 705/35

(58) Field of Classification Search ............ 705/14–52
See application file for complete search history.

(56) References Cited

U.S. PATENT DOCUMENTS

| | | | | |
|---|---|---|---|---|
| 4,797,913 | A | | 1/1989 | Kaplan et al. ............... 379/91 |
| 5,345,501 | A | | 9/1994 | Shelton ..................... 379/89 |
| 5,664,110 | A | * | 9/1997 | Green et al. ................. 705/26 |
| 5,826,245 | A | * | 10/1998 | Sandberg-Diment ......... 705/44 |
| 5,901,287 | A | * | 5/1999 | Bull et al. .................. 709/218 |
| 5,930,767 | A | * | 7/1999 | Reber et al. ................. 705/26 |
| 6,016,476 | A | * | 1/2000 | Maes et al. ................... 705/1 |
| 6,026,375 | A | * | 2/2000 | Hall et al. .................... 705/26 |
| 6,134,548 | A | * | 10/2000 | Gottsman et al. ............ 707/5 |
| 6,314,406 | B1 | * | 11/2001 | O'Hagan et al. ............. 705/14 |
| 6,356,905 | B1 | * | 3/2002 | Gershman et al. ........... 707/10 |
| 6,393,408 | B1 | * | 5/2002 | Mosher et al. ................ 705/28 |
| 6,401,085 | B1 | * | 6/2002 | Gershman et al. ............ 707/4 |
| 6,463,534 | B1 | * | 10/2002 | Geiger et al. ............... 713/168 |
| 6,512,919 | B2 | * | 1/2003 | Ogasawara .............. 455/422.1 |
| 6,526,335 | B1 | * | 2/2003 | Treyz et al. .................... 701/1 |
| 6,564,213 | B1 | * | 5/2003 | Ortega et al. .................. 707/5 |

FOREIGN PATENT DOCUMENTS

WO    WO 98/28900    7/1998

OTHER PUBLICATIONS

Tim Clark, "E-commerce firm opens wallet", Jun. 15, 1998, pp. 1-3, http://news.cnet.com/news.
Tim Clark, "CyberCash moves to thin wallet", Aug. 20, 1998, pp. 1-3, http://news.cnet.com/news.

\* cited by examiner

*Primary Examiner*—Frantzy Poinvil
(74) *Attorney, Agent, or Firm*—Pillsbury Winthrop Shaw Pittman, LLP

(57) ABSTRACT

Processing an electronic order involves receiving from a mobile customer device first order data for an order that contains less than a minimum set of data required by a merchant to completely process the order. Additional information required by the merchant to completely process the order is retrieved. Second order data is generated based upon the first order data and the additional information. The second order data contains at least the minimum set of data required by the merchant to completely process the order. The second order data is provided to a merchant for processing.

48 Claims, 6 Drawing Sheets

APPROACH FOR PROCESSING ELECTRONIC ORDERS

FIELD OF THE INVENTION

The present invention relates generally to processing electronic orders, and more specifically, to an approach for allowing devices with minimal processing capabilities to make electronic orders.

BACKGROUND OF THE INVENTION

The worldwide packet data communication network now commonly referred to as the "Internet" has experienced extraordinary growth and acceptance. The Internet provides access to hundreds of millions of electronic documents, making it the largest single source of information in the world. As used herein, the term "electronic document" refers to any type of data or information in electronic form. Examples of electronic documents include, without limitation, text documents and web pages. In addition to providing access to vast amounts of information, the Internet provides a medium for a plethora of exciting and useful services such as electronic mail, user-to-user chat services and even the ability to place conventional telephone calls, sometimes referred to generally as "voice over IP."

Arguably one of the most important services provided by the Internet medium is electronic commerce or "ecommerce." Ecommerce refers to electronic transactions conducted over the Internet. The Internet allows customers to purchase a wide variety of products and services directly from merchants. Many merchant web sites and shopping portals sport sophisticated user interfaces that greatly simplify locating and purchasing products and services for customers at a reduced cost to consumers. For example, some shopping portals provide a comparative shopping feature that allows customers to compare prices and terms offered by different merchants for the same or comparable products.

Customers have conventionally used personal computers to complete ecommerce transactions. The advent of small, mobile devices, such as Personal Digital Assistants (PDAs) and mobile telephones, allow users greater flexibility in conducting ecommerce transactions. Using mobile devices, customers can shop at multiple merchants and make purchases. Mobile devices with wireless Internet connections transform the concept of wireless computing and arguably greatly increase the value and usefulness of mobile devices. Customers can now view web pages from merchant sites and make purchases from any location, so long as they can establish a wireless connection to the Internet. The geographical regions available to wireless Internet customers continues to expand as wireless infrastructure grows.

There are several problems with processing ecommerce transactions over the Internet using mobile devices. First, it is difficult, and sometimes impossible, for mobile devices to process standard web pages because of processing limitations inherent in mobile devices. The relatively small screens and limited processing resources in mobile devices greatly inhibit or completely prevent the display of conventional web pages. For example, most cellular telephones necessarily have relatively small displays because of their small physical size. Second, by PC standards, mobile devices generally have fairly crude Graphical User Interfaces (GUIs). This makes specifying complete user information, such as billing and shipping information, as well as product information from mobile devices difficult and tedious. Third, providing web pages to mobile devices is generally significantly slower than to personal computers because of bandwidth limitations in wireless communications networks. These problems are exacerbated with web pages that are rich in graphics. The result is that it is generally very difficult, if not impossible, to conduct ecommerce over the Internet with mobile devices using conventional web pages, especially over wireless communications links.

One solution to this problem is to generate special web pages for mobile devices that contain less "content" than conventional web pages. These pages generally contain only a subset of the text contained in conventional web pages and little or no graphical information. Despite the attractiveness of this solution, it has several significant drawbacks. First, the special web pages must be generated, which can require substantial computational and storage resources and place additional burdens on merchants. Moreover, the content of some web pages changes very frequently, which increases the frequency at which the corresponding special web pages must be re-generated. Generating special web pages "on-the-fly" can consume a significant amount of computational resources and increase the amount of time required to provide the special web pages to customers' mobile devices. Furthermore, web pages have to be customized for different mobile devices since mobile devices do not necessarily use the same interface standard.

Second, merchant web sites must know to provide the special web pages instead of the full web pages, which requires that merchant web sites know when a web page request originates from a mobile device. This may require mobile devices to access merchant sites through a special portal or a proxy server.

Based upon the increasing need for customers to conduct ecommerce transactions over the Internet and the limitations in prior approaches, an approach for processing electronic orders that does not suffer from limitations in prior approaches is highly desirable. Further, based upon the particular limitations and problems associated with conducting ecommerce transactions over the Internet using mobile devices with wireless connections to the Internet, there is a particular need for an approach for processing ecommerce transactions over the Internet from mobile devices with wireless connections to the Internet that does not suffer from the problems appurtenant to conventional approaches.

SUMMARY OF THE INVENTION

According to one aspect of the invention, a method is provided for processing electronic orders. The method includes receiving from a mobile customer device first order data for an order and device identification data, wherein the first order data includes less than a minimum set of data required by a merchant to completely process the order and the device identification data identifies the mobile customer device. The method also includes retrieving, based upon the device identification data, at least one data item that is not contained in the first order data, but that is required to completely process the order. The method also includes generating, based upon the first order data and the at least one data item, second order data that includes the minimum set of data required by the merchant to completely process the order. The method also includes providing the second order data to the merchant for processing.

According to another aspect of the invention, a computer system for processing electronic orders is provided. The computer system includes one or more processors and a memory communicatively coupled to the one or more processors. The memory includes one or more sequences of one or more instructions which, when executed by the one or more processors, cause the one or more processors to perform several steps. The steps include receiving from a mobile customer device first order data for an order and device identification data. The first order data includes less than a minimum set of data required by a merchant to completely process the order and the device identification data identifies the mobile customer device. The steps also include retrieving, based upon the device identification data, at least one data item that is not contained in the first order data, but that is required to completely process the order. The steps also include generating, based upon the first order data and the at least one data item, second order data that includes the minimum set of data required by the merchant to completely process the order. The steps also include providing the second order data to the merchant for processing.

According to another aspect of the invention, an apparatus is provided for processing electronic orders. The apparatus includes an information repository and a transaction facilitator communicatively coupled to the information repository. The transaction facilitator is configured to perform various functions, including receiving from a mobile customer device over a wireless communications link first order data for an order and device identification data, where in the first order data includes less than a minimum set of data required by a merchant to completely process the order and the device identification data identifies the mobile customer device. The transaction facilitator is also configured to retrieve from the information repository, based upon the device identification data, at least one data item that is not contained in the first order data, but that is required to completely process the order. The transaction facilitator is also configured to generate, based upon the first order data and the at least one data item, second order data that includes the minimum set of data required by the merchant to completely process the order. Finally, the transaction facilitator is configured to provide the second order data to the merchant for processing.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE INVENTION

In the following description, for the purposes of explanation, specific details are set forth in order to provide a thorough understanding of the invention. However, it will be apparent that the invention may be practiced without these specific details. In other instances, well-known structures and devices are depicted in block diagram form in order to avoid unnecessarily obscuring the invention.

Various aspects of the invention are described in more detail hereinafter in the following sections: (1) functional overview; (2) selecting and assigning links to catalogs; (3) transaction encapsulation; (4) crawling links selected by the catalog manager; (5) document management and storage; (6) dynamic allocation and de-allocation of catalogs; (7) site information processing; (8) other architecture configurations; and (9) implementation mechanisms.

1. Functional Overview

Processing an electronic order in accordance with an embodiment of the invention generally involves receiving from a mobile customer device first order data for an order that contains less than a minimum set of data required by a merchant to completely process the order. Additional information required by the merchant to completely process the order is retrieved or otherwise obtained. Second order data is generated based upon the first order data and the additional information. The second order data contains at least the minimum set of data required by the merchant to completely process the order. The second order data is provided to a merchant for processing.

Figure 1:
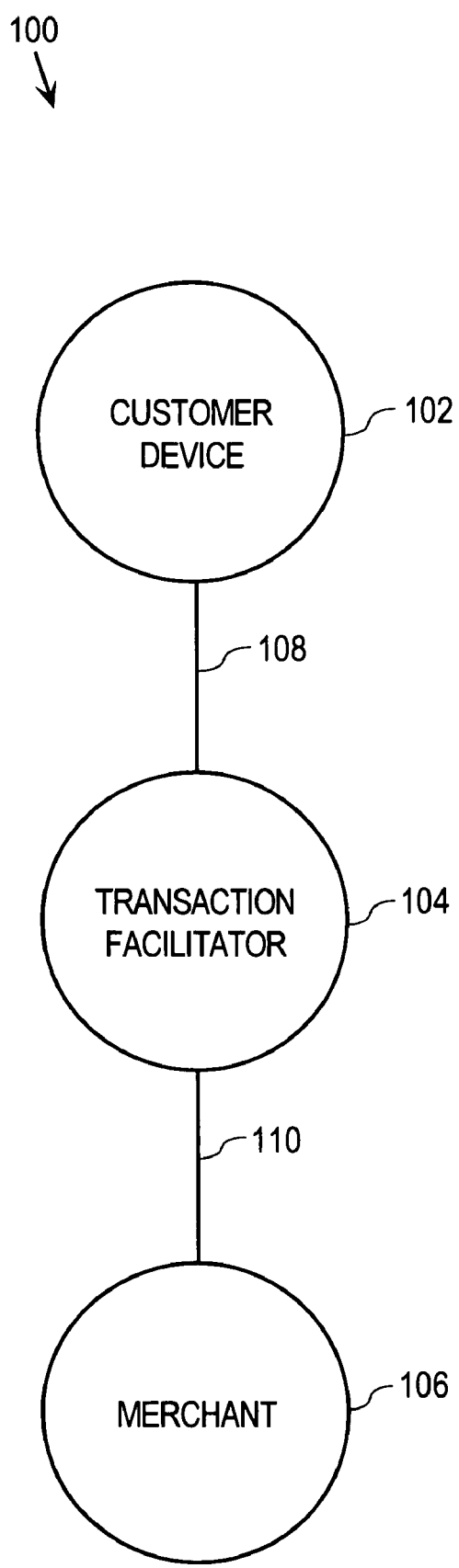
FIG. 1 is block diagram of an arrangement for processing electronic orders according to an embodiment of the invention.

FIG. 1 is a block diagram of an arrangement 100 for processing electronic orders according to an embodiment of the invention. Arrangement 100 includes a customer device 102, a transaction facilitator 104 and a merchant 106. Customer device 102 generates and provides first order data for an order for goods and/or services to transaction facilitator 104 over a communications link 108. The first order data specifies one or more products and/or services that a customer associated with customer device 102 desires to purchase from merchant 106. The first order data, however, contains less than a minimum set of data required by merchant 106 to completely process the order. Customer device 102 may be any mechanism for generating and providing orders to transaction facilitator 104. Examples of customer device 102 include, without limitation, a personal computer, a mobile device and a mobile telephone, such as a Wireless Access Protocol (WAP) telephone.

Transaction facilitator 104 generates second order data based upon the first order data from customer device 102 and other data retrieved or otherwise obtained by transaction facilitator 104. Unlike the first order data received from customer device 102, the second order data generated by transaction facilitator 104 contains at least the minimum set of data required by merchant 106 to process the order. The second order data generated by transaction facilitator 104 is provided to merchant 106 over a communications link 110 for processing by merchant 106. Transaction facilitator 104 may also format the second order data according to the requirements of merchant 106.

Communications links 108, 110 may be any mechanisms or mediums for exchanging data between customer device 102 and transaction facilitator 104 and between transaction facilitator 104 and merchant 106, respectively, and the invention is not limited to any particular mechanism or medium. Examples of communications links 108, 110 include, without limitation, direct connections, network connections, Internet connections and wireless communications links.

Figure 2:
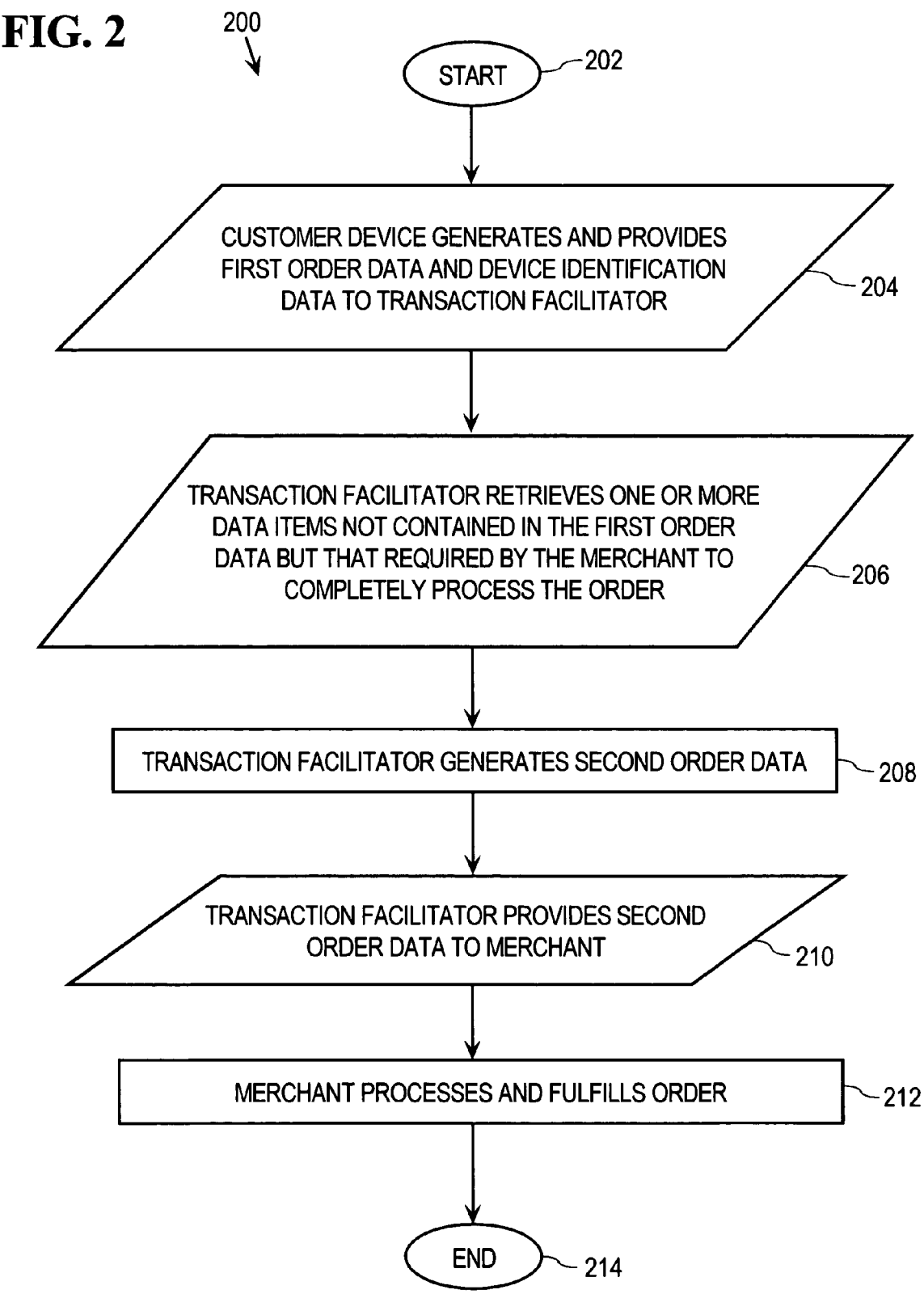
FIG. 2 is a flow diagram of an approach for processing electronic orders Internet according to an embodiment of the invention.

The approach for processing orders according to an embodiment of the invention is now described with reference to the arrangement 100 of FIG. 1 and a flow diagram 200 of FIG. 2. After starting in step 202, in step 204, customer device 102 generates and provides first order data for an order and device identification data to transaction facilitator 104 over communications link 108. The first order data specifies products or services that customer device 102 desires to receive from merchant 106. The first order data includes less than a minimum set of data required by merchant 106 to completely process the order. For example, the first order data may not include all of the billing, shipping or product information necessary for merchant 106 to completely process the order. The device identification data identifies the customer device.

Customer device 102 may have all information required to generate the first order data. Alternatively, customer device 102 may request or otherwise be provided information from transaction facilitator 104 required by customer device 102 to generate the first order data. For example, in the situation where customer device 102 is a mobile device that communicates with transaction facilitator 104 over a wireless Internet connection, customer device 102 may request and receive one or more web pages from transaction facilitator 104 that specify information about products and services offered by merchant 106. Customer device 102 may alternatively obtain product and service information, in any form, from a wireless application portal. Customer device 102 generates the first order data based upon the product and service information obtained by customer device 102.

In step 206, transaction facilitator 104 receives the first order data and the device identification data from customer device 102 over communications link 108. In step 208, transaction facilitator 104 retrieves, or otherwise obtains, based upon the device identification data, one or more data items that are not contained in or specified by the first order data, but that are required by merchant 106 to completely process the order. Examples of data items include, without limitation, billing, shipping and product information.

In step 210, transaction facilitator 104 generates second order data based upon the first order data and the one or more retrieved data items. The second order data includes at least the minimum set of data required by merchant 106 to completely process the order. In step 212, transaction facilitator 104 provides the second order data to merchant 106 over communications link 110. In step 214, merchant 106 completely processes and fulfills the order and the process is complete in step 216.

This approach for processing orders allows customer devices 102 to place orders without having to provide the minimal set of data required by merchant 106 to completely process the order. This reduces the amount of processing that must be performed by customer devices 102 to place orders and also reduces the amount of bandwidth required by communications link 108. This is particular beneficial for mobile customer devices that have limited processing capabilities and for wireless applications where bandwidth is limited. Furthermore, customer device 102 does not have to provide the first order data in a format required by merchant 106. The approach also does not require any modification to merchant 106 since orders are generated by transaction facilitator 104 with the format and content required by merchant 106.

2. Information Repository

Figure 3:
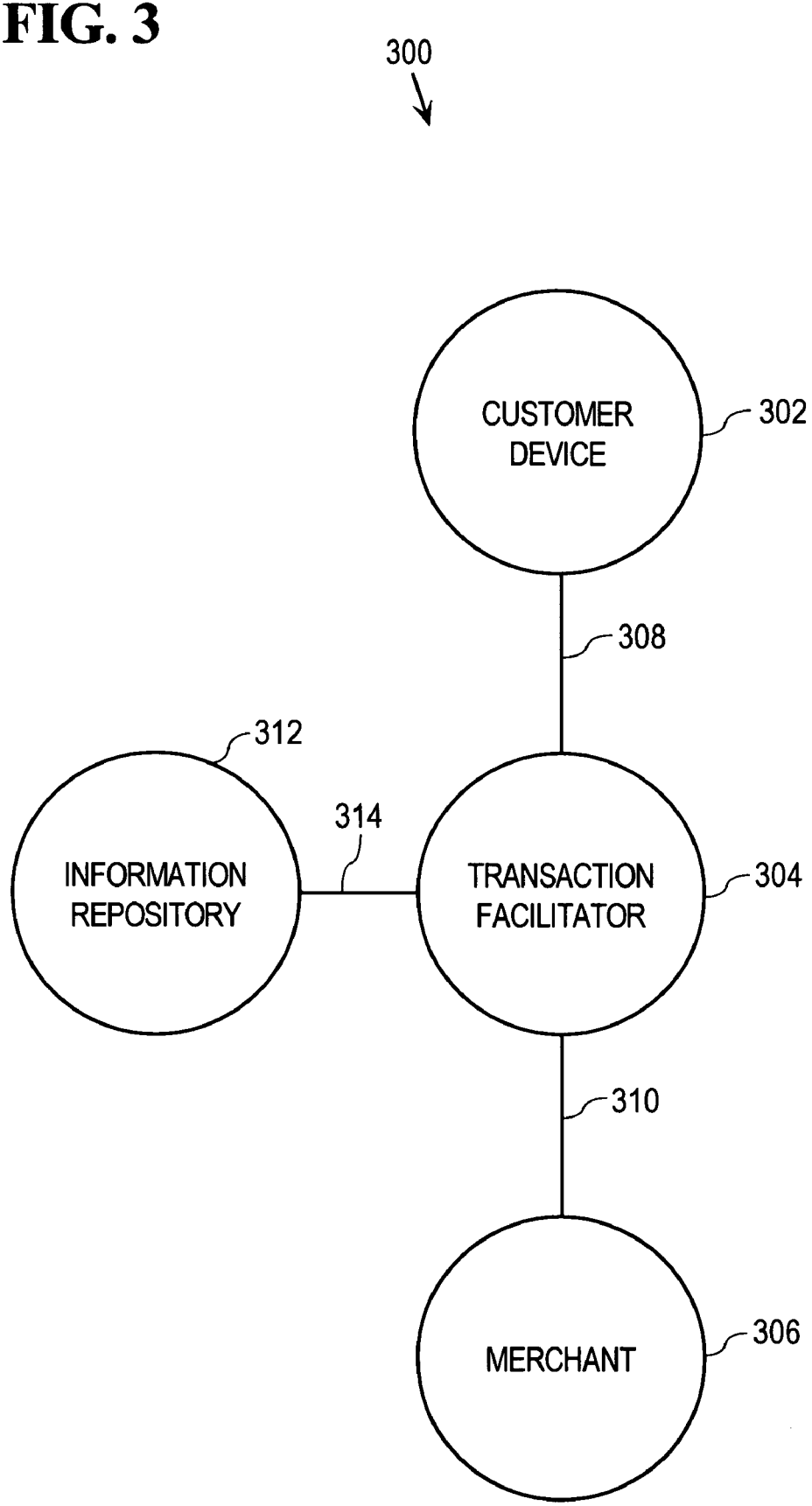
FIG. 3 is a block diagram of an arrangement for processing electronic orders using a transaction facilitator and a information repository according to an embodiment.

According to one embodiment of the invention, an information repository is used to maintain information used to generate second order data provided to merchants. FIG. 3 is a block diagram of an arrangement 300 for processing electronic orders using a transaction facilitator 304 and an information repository 312 according to an embodiment of the invention.

Arrangement 300 includes a customer device 302, a transaction facilitator 304 and a merchant 306. Customer device 302 generates and provides first order data for an order to transaction facilitator 304 over a communications link 308. The first order data contains less than a minimum set of data required by merchant 306 to completely process the order. Transaction facilitator 304 generates second order data based upon the first order data received from customer device 302 and other data obtained by transaction facilitator 304. Unlike the first order data received from customer device 302, the second order data generated by transaction facilitator 304 contain at least the minimum set of data required by merchant 306 to process the order. The second order data generated by transaction facilitator 304 is provided to merchant 306 over communications link 310 for processing by merchant 306. Transaction facilitator 304 may also format the second order data according to the requirements of merchant 306.

Communications links 308, 310 may be implemented by any mechanisms or mediums for exchanging data between customer device 302 and transaction facilitator 304 and between transaction facilitator 304 and merchant 306, respectively and the invention is not limited to any particular mechanism or medium. Examples of communications links 308, 310 include, without limitation, direct connections, network connections, Internet connections and wireless communications links.

Arrangement 300 also includes an information repository 312 communicatively coupled to transaction facilitator 304 via a communications link 314. As with communications links 308, 310, communications link 314 may be implemented by any mechanism or medium for exchanging data between information repository 312 and transaction facilitator 304. Information repository 312 may contain any data required to generate the second data that is not included in the first data. Examples of data maintained by information repository include, without limitation, customer, order fulfillment and product information used to process orders.

According to one embodiment of the invention, transaction facilitator 304 retrieves customer and order fulfillment information from information repository 312 based upon the device identification data received from customer device 302. For example, suppose that customer device 302 is a mobile customer device, such as a mobile telephone, and communications link 308 is a wireless communications link. Suppose further that the device identification data provided by customer device 302 is a telephone number for customer device 302. In this situation, transaction facilitator 304 uses the telephone number received from customer device 302 to retrieve, from information repository 312, billing and address information for customer device 302. Retrieving billing and address information from information repository 312 may also be based upon customer authentication data received from customer device 302, as described in more detail hereinafter. The billing and address information is used by transaction facilitator 304 to generate the second order data provided to merchant 306.

According to another embodiment of the invention, transaction facilitator 304 retrieves product information from information repository 312. Suppose that the first order data does not contain the minimum amount of product information required by merchant 306 to completely process the order. In this situation, transaction facilitator examines the first order data and compares the product information contained in the first order data to the minimum amount of product information required by merchant 306 to completely process the order. Information that specifies the minimum amount of product information required by merchant 306 to completely process an order 304 may be maintained in information repository 312. In the present example, transaction facilitator 304 determines that the first order data does not contain the minimum product information and therefore retrieves additional product information from information repository 312 so that the second order data will contain at least the minimum product information required by merchant 306 to completely process the order. The additional product information may include, for example, a product identification code or description or product pricing information. The additional product information may include merchant-specific information, such as a product code or symbol, required by merchant 306 to completely process the order.

In some situations the product information contained in the first order data provided by customer device 302 is not sufficiently specific to allow the minimum amount of product information required by merchant 306 to be generated. This typically occurs where one or more required product attributes are not specified by customer device 302. For example, suppose that customer device 302 generates and provides to transaction facilitator 304 first order data that specifies an order for one dozen red roses to be shipped in a box to a particular address. Suppose further that the first order data does not specify whether the roses are to be short or long stemmed, which is required by merchant 306 to completely process the order. In this situation, information from information repository 312 is not helpful since it cannot be determined from the first order data whether long or short-stemmed roses are to be ordered. Therefore, according to one embodiment of the invention, transaction facilitator 304 determines whether additional product information is required from customer device 302 to generate the second order data. To make this determination, transaction facilitator 304 examines the first order data received from customer device 302 to identify the particular product being ordered. Transaction facilitator 304 then retrieves data from information repository 312 that specifies the minimum product data required by merchant 306 for the particular product. Transaction facilitator 304 then compares the product data contained in the first data to the minimum set of product data required by merchant 306. For situations where additional information is required, transaction facilitator 304 generates and sends a request for additional information to customer device 302. In the present example where customer device 302 is a small mobile device, such as a PDA or mobile telephone, the request may cause a text message such as "Do You Want Long or Short-Stemmed Roses?" to be displayed on customer device 302, along with selection icons associate with long and short-stemmed roses. The request may be sent to customer device 302 over communications link 308 or another communications link. A user then selects one of the icons and additional order data is generated and sent by customer device 302 to transaction facilitator 304. Transaction facilitator 304 then uses the additional order data to complete the second order data for merchant 306. This approach may also be used in situations where multiple interactions are required between customer device 302 and transaction facilitator 304.

According to one embodiment of the invention, transaction facilitator 304 retrieves information from information repository 312 that indicates alternative merchants for the particular product specified by the first order data. This allows transaction facilitator 304 to provide the second order data to the alternative merchants if the product is not available from merchant 306. For example, suppose that the first order data specifies an order for a particular product from merchant MMM. Transaction facilitator 304 queries information repository 312 and learns that merchant MMM no longer carries the particular product and that information repository 312 includes information that specifies another source, i.e., another merchant PPP, for the particular product. In this situation, transaction facilitator 304 generates the second order data to specify an order for the particular product from merchant PPP instead of merchant MMM.

According to one embodiment of the invention, transaction facilitator 304 retrieves information from information repository 312 that indicates alternative products when the particular product specified by the first order data is not available. For example, suppose that the first order data specified the purchase of product AAA that is no longer available. In this situation transaction facilitator 304 queries information repository 312 for equivalent products. Suppose that information contained in information repository 312 indicates that product BBB is an equivalent, i.e., a replacement, product for product AAA. Transaction facilitator 304 then generates the second order data to specify product BBB in place of product AAA.

Information repository 312 may be implemented in a variety of forms and the invention is not limited to any particular form. Example implementations of information repository 312 include, without limitation, a lookup table, a file server, a database system, a wallet server, or any other type of information management system for storing customer, order fulfillment and product information. Information repository 312 may be co-located on the same computing platform as transaction facilitator 304 and merchant 306, or may be located on a different computing platform as in a distributed computing environment. Information repository 312 is illustrated in FIG. 3 as a separate entity for purposes of explanation, but may be integrated into transaction facilitator 304 or merchant 306. Information contained in information repository 312 may be configured, i.e., created, edited or deleted, by users. For example, users (not illustrated) may access information repository 312 over a communications link using a generic Web browser to establish, edit or delete fulfillment information, such as billing or address information. Users may also configure information contained in information repository 312 using customer device 302, assuming that customer device 302 has the necessary capability to perform this function.

3. Transaction Encapsulation

In some situations, processing an order between a customer and a merchant requires several interactions between the customer and the merchant. Conventional order processing typically includes at least two phases, a product selection phase and a checkout phase. As previously described herein, the product selection phase may include several steps to adequately specify a particular product to purchase. A checkout phase may also include several steps to confirm billing and shipping information and to perform a final purchase confirmation.

Therefore, according to one embodiment of the invention, transaction facilitator 304 interacts with merchant 306 on behalf of customer device 302. Specifically, transaction facilitator 304 performs some or all of the interactions that would ordinarily be performed directly between customer device 302 and merchant 306. This may include retrieving information, for example, billing and shipping information, from information repository 312 and providing this information to merchant 306. This may also include the extraction of data from merchant 306 and updating information repository 312 accordingly.

According to one embodiment of the invention, an XML-based programmatic representation of customer/merchant interaction is provided. An XML document is created to encapsulate process and data required by merchant 306 to completely process the order. More specifically, the XML document includes all process information and data required by merchant 306 to completely process the order. The XML document is generated and processed by transaction facilitator 304 to complete the interaction with merchant 306. The XML document may also be stored and reused again for another transaction. According to one embodiment of the invention, one or more XML configuration files are created for each merchant to provide merchant-specific process steps and data.

4. Customer Authentication

According to one embodiment of the invention, transaction facilitator 304 authenticates a customer associated with, i.e., a user of, customer device 302. Transaction facilitator 304 receives customer authentication data from customer device 302. The customer authentication data may be included with the first order data, the device identification data or provided separately. Transaction facilitator 304 uses the customer authentication data to determine whether a user of customer device 302 is authorized to place a particular order. For example, suppose that the customer authentication data is in the form of a personal identification number (PIN). Transaction facilitator 304 compares the PIN provided by customer device 302 to data stored in information repository 312 for customer device 302 to determine whether the PIN provided by customer device 302 is a valid PIN for customer device 302. If the PIN provided by customer device 302 is a valid PIN for customer device 302 then transaction facilitator 304 allows the transaction to proceed normally. If the PIN provided by customer device 302 is not a valid PIN for customer device 302, then transaction facilitator 304 does not allow the transaction to be completed. In this situation, transaction facilitator 304 may, for example, send a message to customer device 302 to indicate that the PIN provided by customer device 302 is not valid.

5. Enterprise Adapters

Figure 4:
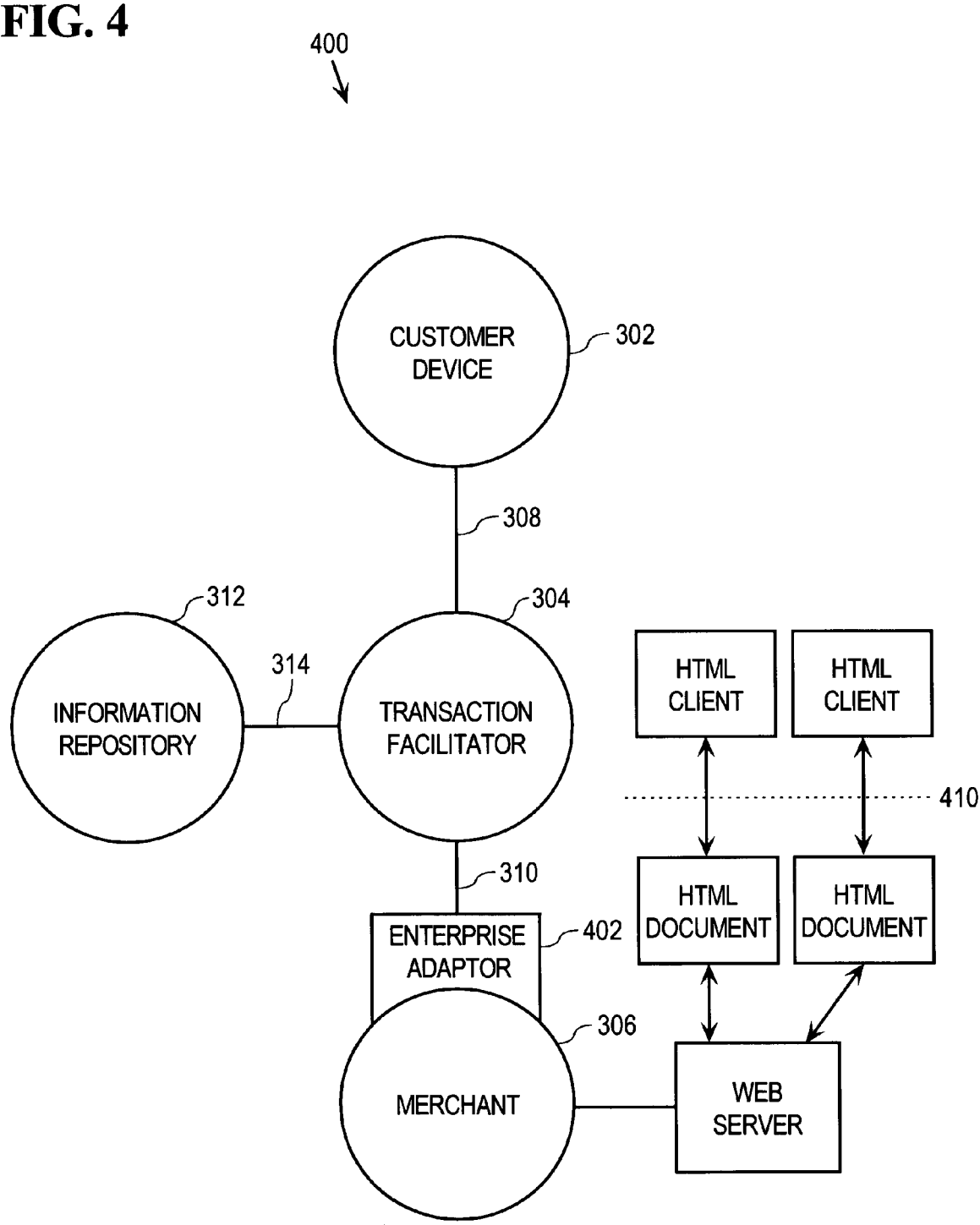
FIG. 4 is a block diagram of an arrangement for processing electronic orders using an enterprise adaptor coupled to merchant according to an embodiment.

According to another embodiment of the invention, an enterprise adaptor is associated with a merchant to provide a variety of services to a transaction facilitator. FIG. 4 is a block diagram of an arrangement 400 for processing electronic orders according to an embodiment of the invention using an enterprise adaptor 402 coupled to merchant 306. Enterprise adaptor 402 performs a variety of functions for transaction facilitator 304 and merchant 306 including transaction insertion, product/service publishing and product searching.

A. Transaction Insertion

One function provided by enterprise adaptor 402 on behalf of transaction facilitator 304 is "transaction insertion." Transaction insertion generally involves providing the second order data generated by transaction facilitator 304 into the "back end" of the order processing mechanism of merchant 306. This avoids having to provide orders to merchant 306 using the conventional web page-based shopping interface 410. Instead of transaction facilitator 304 providing the second data to the web page-based shopping interface 410 provided by merchant 306, enterprise adaptor 402 receives the second order data from transaction facilitator 304 and inserts the second order data into the "back end" of the order processing mechanism of merchant 306. According to one embodiment of the invention, enterprise adaptor 402 also formats the second order data in the format required by the order processing mechanism of merchant 306. This relieves transaction facilitator 304 of the formatting burden.

B. Product/Service Publishing

According to one embodiment of the invention, enterprise adaptor 402 extracts product and service information from merchant 306 and publishes the product and service information to transaction facilitator 304. The product and service information is then formatted and provided by transaction facilitator 304 to customer device 302 in accordance with the requirements of a particular application. For example, in the situation where customer device 302 is a wireless mobile customer device, transaction facilitator 304 formats the product and service information according to the requirements of the particular wireless application protocol employed by transaction facilitator 304 and customer device 302.

The use of enterprise adaptor 402 for transaction insertion and product/service publishing allows merchant 306 to sell products and service to mobile users without having to make any customizations of its existing web-page based ordering system.

C. Product Searching

Many merchants have web sites that contain large amounts of information about the products and services that they offer, but the information is not in a form that is readily searchable. The information may not be organized in a manner, or be in a form that is amenable, to searching. Merchants that have their web site information in a form suitable for searching, often do not have the ability to regularly re-generate the searchable data as readily as the information on their web site changes. Therefore, according to one embodiment of the invention, enterprise adaptor 402 provides a product search capability to merchant 306. This generally involves enterprise adaptor 402 extracting product and service information from merchant 306, aggregating the product/service information and providing the product/service information back to merchant 306 in a form that is readily searchable or in a form that can otherwise be readily used by merchant 306 to perform product/service searches. For example, merchant 306 may maintain a sophisticated web site that contains an extensive amount of information about products and services offered by merchant 306. Merchant 306 may not have the capability or expertise to effectively format and/or organize the product and service information on its web site in a form that is readily searchable. Therefore, enterprise adaptor 402 extracts product and search information from merchant 306, aggregates and/or formats the product and search information into a form that is readily searchable and/or useable by merchant 306 for searching. The aggregated/formatted information is then provided to merchant 306.

6. Shopping Services

Figure 5:
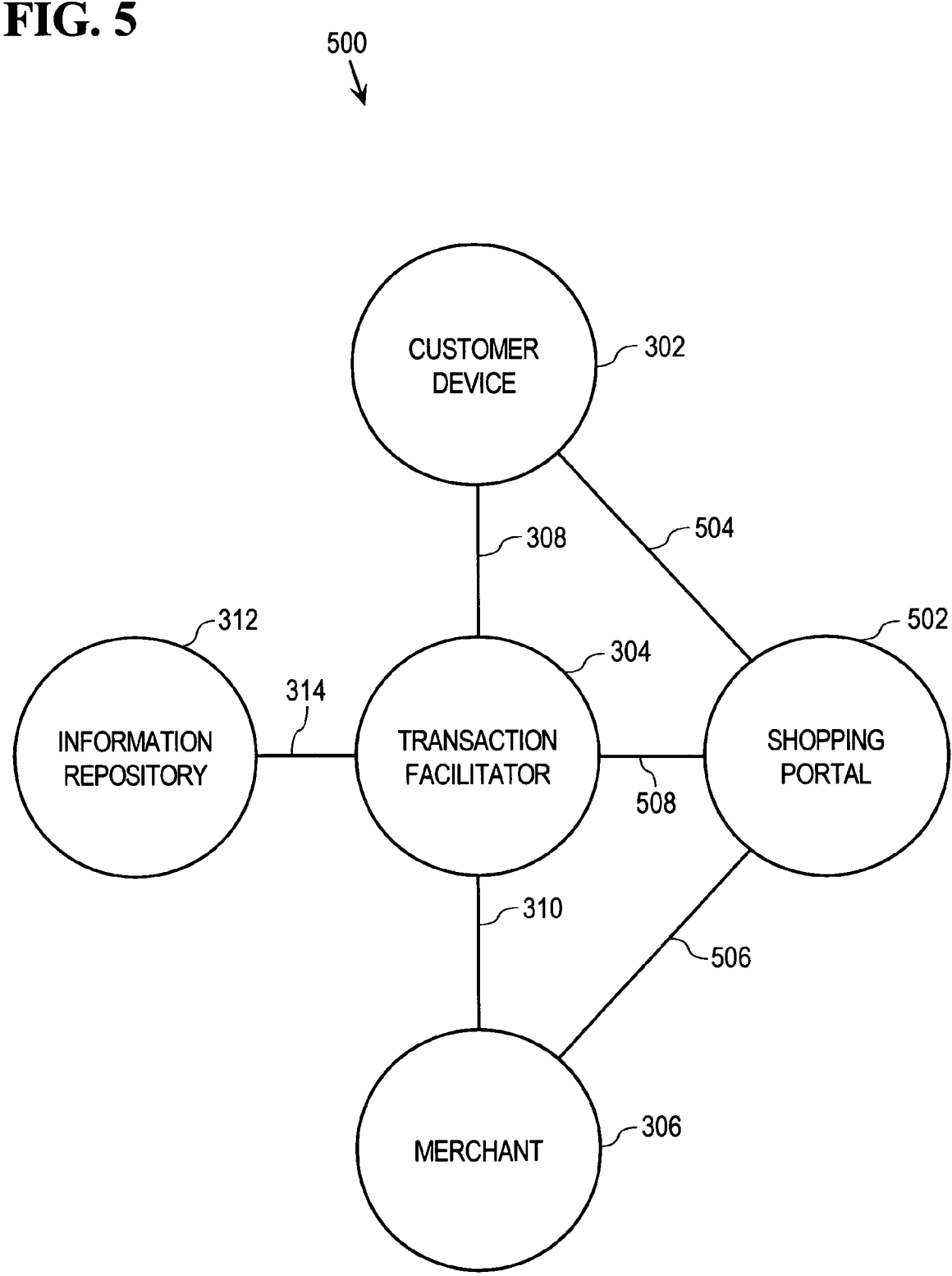
FIG. 5 is a block diagram of an arrangement for processing electronic orders using a shopping portal according to an embodiment of the invention.

According to one embodiment of the invention, a transaction facilitator is used in conjunction with a shopping portal to process electronic orders. FIG. 5 is a block diagram of an arrangement 500 for processing electronic orders using a shopping portal according to an embodiment of the invention. In arrangement 500, a shopping portal 502 is communicatively coupled to customer device 302 via a communications link 504 and to merchant 306 via a communications link 506. Shopping portal 502 may optionally be communicatively coupled to transaction facilitator 304 via a communications link 508.

In arrangement 500, shopping portal 502 provides product and service information to customer device 302 according to the type of customer device 302 and the communications protocol used between customer device 302 and shopping portal 502. Shopping portal 502 obtains the product and service information from merchant 306, aggregates the information and provides the information to customer device 302 in a form most suitable for customer device 302. Customer device 302 provides first order data and device identification data to transaction facilitator 304. Transaction facilitator 304 generates second order data based upon the first order data and the device identification data and provides the second order data to merchant 306.

7. Communications Protocols and Formatting

A variety of communications protocols may be used to exchange data between customer device 302, transaction facilitator 304, merchant 306, information repository 312 and shopping portal 502. The communications protocol used for communications between customer device 302 and transaction facilitator 304 may be different than the communications protocol used for communications between transaction facilitator 304 and merchant 306. Thus, customer device 302 is not required to support the communications protocols of merchant 306 and may support a merchant independent communications protocol.

According to one embodiment of the invention, Inktomi Corporation's Transaction Exchange Protocol (TXP) is used for communications on communications link 308 and also on communications link 310 when enterprise adaptor 402 is used.

8. Implementation Mechanisms

The approach for processing electronic orders is applicable to any electronic order applications. The approach may be implemented at any type of intermediary, such as shopping portals, or as a stand-alone mechanism. The approach may also be implemented at merchant sites. Embodiments of the invention may be implemented in hardware circuitry, in computer software, or a combination of hardware circuitry and computer software and the invention is not limited to a particular hardware or software implementation.

Figure 6:
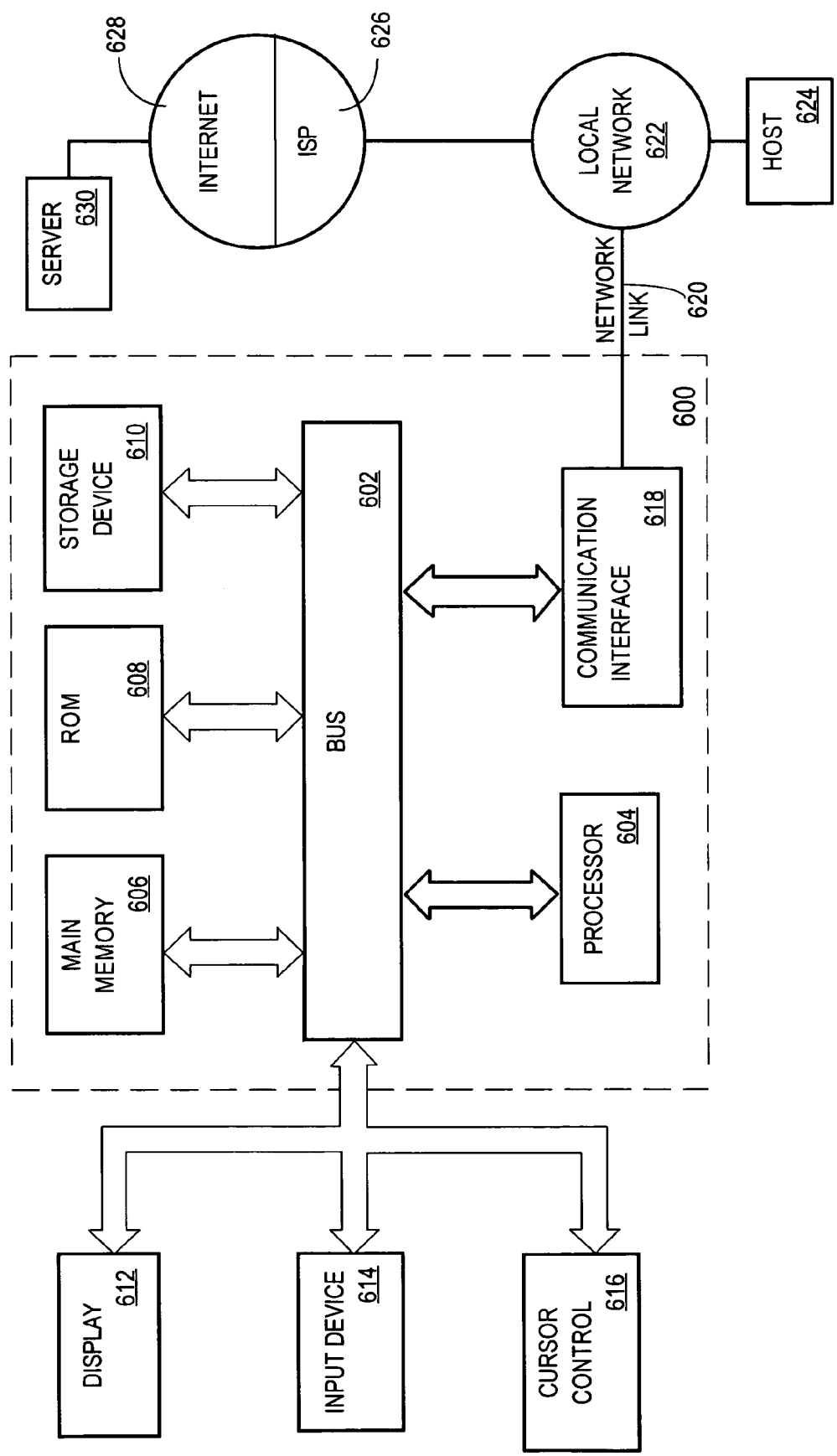
FIG. 6 is a block diagram of a computer system upon which embodiments of the invention may be implemented.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for processing electronic orders. According to one embodiment of the invention, the processing of electronic orders is provided by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. One or more processors in a multi-processing arrangement may also be employed to execute the sequences of instructions contained in main memory 606. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infrared transmitter to convert the data to an infrared signal. An infrared detector coupled to bus 602 can receive the data carried in the infrared signal and place the data on bus 602. Bus 602 carries the data to main memory 606, from which processor 604 retrieves and executes the instructions.

The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the worldwide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. In accordance with the invention, one such downloaded application provides for processing electronic orders as described herein. The received code may be executed by processor 604 as it is received, and/or stored in storage device 610, or other non-volatile storage for later execution. In this manner, computer system 600 may obtain application code in the form of a carrier wave.

The novel approach described herein for processing electronic orders provides several advantages over prior approaches. First, customer devices can successfully place orders without having to provide the minimum set of data normally required by merchants to completely process orders. This reduces the amount of processing that must be performed by customer devices which can be particularly important for mobile customer devices, such as mobile telephones, mobile devices or other handheld devices, that have limited processing capabilities. For example, in the context of a particular customer device placing an order with a merchant over the Internet, the particular customer device does not have to process conventional HTML web pages. The particular customer device may instead provide only a small subset of the minimum set of data required by merchants. Reducing the amount of data that must be provided by customer devices over communications links also reduces the amount of bandwidth required for customer devices to place orders, which can be particularly beneficial for wireless applications or other limited bandwidth applications.

Second, the format of orders made by customer devices may be completely independent of order formats required by merchants since transaction facilitator 104 handles formatting. This provides many benefits. For example, this eliminates the need for customer devices to support multiple merchant formats that may vary greatly from merchant to merchant. Similarly, this also eliminates the need for merchants to support different customer device formats that may vary greatly and change frequently, particularly for wireless application protocols.

Third, the approach allows customer device orders to be placed directly with merchants, thereby avoiding the use of conventional web page interfaces supported by merchants.

In the foregoing specification, the invention has been described with reference to specific embodiments thereof. However, various modifications and changes may be made thereto without departing from the broader spirit and scope of the invention. The specification and drawings are, accordingly, to be regarded in an illustrative sense rather than a restrictive sense.

What is claimed is:

1. A method for processing electronic orders comprising the computer implemented steps of:

receiving, at an intermediary disposed between and separate from a mobile device and a plurality of merchants, first order data for an order and device identification data from the mobile device, wherein the first order data includes data regarding one or more products or services that a user associated with the mobile device desires to purchase and data regarding one of the plurality of merchants from which the user desires to purchase the one or more products or services, yet includes less than a minimum set of data required by the one merchant to completely process the order, and wherein the device identification data identifies the mobile device;

storing, at an intermediary, information that specifies the minimum set of data required by at least the one merchant to completely process the order;

comparing, by the intermediary, first order data to the minimum set of data required by the one merchant to completely process the order;

retrieving, by the intermediary, based upon the comparison and the device identification data, at least one data item that is not included in the first order data, but that is needed to have the minimum set of data required by the one merchant to completely process the order;

generating, by the intermediary, based upon the first order data and the at least one data item, second order data that includes the minimum set of data required by the one merchant to completely process the order; and providing the second order data to the one merchant for processing.

2. The method as recited in claim 1, wherein the method further comprises:

receiving user authentication data for a user associated with the mobile device, and authenticating the user using the user authentication data.

3. The method as recited in claim 2, wherein the user authentication data includes a Personal Identification Number (PIN) for the user and wherein the method further comprises authenticating the user using the PIN.

4. The method as recited in claim 1, wherein the first order data further comprises user identification data that identifies the user,
- wherein the method further comprises retrieving, based upon the customer user identification data, order fulfillment information associated with the user and
- wherein the step of generating, based upon the first order data and the at least one data item, second order data that includes the minimum set of data required by the one merchant to completely process the order includes generating, based upon the first order data, the at least one data item and the order fulfillment information, second order data that includes the minimum set of data required by the one merchant to completely process the order.

5. The method as recited in claim 4, wherein the order fulfillment information includes billing information for the user,
- wherein the step of retrieving order fulfillment information associated with the user includes retrieving billing information for the user and
- wherein the step of generating, based upon the first order data, the at least one data item and the order fulfillment information, second order data that includes the minimum set of data required by the one merchant to completely process the order includes generating, based upon the first order data, the at least one data item and the billing information, second order data that includes the minimum set of data required by the one merchant to completely process the order.

6. The method as recited in claim 4, wherein the order fulfillment information includes shipping information for the user and
- wherein the step of retrieving order fulfillment information associated with the user includes retrieving shipping information for the user.

7. The method as recited in claim 1, wherein the step of generating, based upon the first order data and the at least one data item, second order data that includes the minimum set of data required by the one merchant to completely process the order includes generating, based upon the first order data and the at least one data item, second order data that includes the minimum set of data in a format required by the one merchant to completely process the order.

8. The method as recited in claim 1, wherein the method further comprises retrieving product information based upon the first order data, and
- wherein the step of generating, based upon the first order data and the at least one data item, second order data that includes the minimum set of data required by the one merchant to completely process the order includes generating, based upon the first order data, the at least one data item and the product information, second order data that includes the minimum set of data required by the one merchant to completely process the order.

9. The method as recited in claim 1, wherein the method further comprises:
- determining that the one merchant cannot completely process the order; and
- providing the second order data to a second one of said plurality of merchants for processing.

10. The method as recited in claim 1, wherein the order is for a particular product or service,
- wherein the order cannot be completely processed by the one merchant, and
- wherein the step of generating, based upon the first order data and the at least one data item, the second order data includes generating, based upon the first order data and the at least one data item, second order data that includes the minimum set of data required by the one merchant to completely process an order for a second product or service.

11. The method as recited in claim 1, wherein the first order data and the device identification data are received from the mobile device over a wireless communications link.

12. The method as recited in claim 1, wherein the mobile device is a mobile telephone and
- wherein the device identification data is a telephone number for the mobile telephone.

13. The method as recited in claim 1, wherein the mobile device is a personal digital assistant.

14. The method as recited in claim 1, wherein the mobile device is a mobile personal computer.

15. The method of claim 1, wherein the mobile device receives product and service information according to the type of mobile device and the communications protocol used by the mobile device as determined by the device identification data.

16. A computer-readable medium carrying one or more sequences of one or more instructions which, when executed by one or more processors, cause the one or more processors to perform the steps of:
- receiving, at an intermediary disposed between and separate from a mobile device and a plurality of merchants, first order data for an order and device identification data from the mobile device, wherein the first order data includes data regarding one or more products or services that a user associated with the mobile device desires to purchase and data regarding one of the plurality of a merchants from which the user desires to purchase the identified one or more products or services, yet includes less than a minimum set of data required by the one merchant to completely process the order, and wherein the device identification data identifies the mobile device;
- storing, at an intermediary, information that specifies the minimum set of data required by at least the one merchant to completely process an order;
- comparing, by the intermediary, first order data to the minimum set of data required by the one merchant to completely process the order;
- retrieving, by the intermediary, based upon the comparison and the device identification data, at least one data item that is not included in the first order data, but that is needed to have the minimum set of data required by the one merchant to completely process the order;
- generating, by the intermediary, based upon the first order data and the at least one data item, second order data that includes the minimum set of data required by the one merchant to completely process the order; and
- providing the second order data to the one merchant for processing.

17. The computer-readable medium as recited in claim 16, further comprising one or more additional sequences of instructions which, when executed by the one or more processors, cause the one or more processors to perform the steps of:
- receiving user authentication data for a user associated with the mobile device; and authenticating the user using the user authentication data.

18. The computer-readable medium as recited in claim 17, wherein the user authentication data includes a Personal Identification Number (PIN) for the user, and wherein the computer-readable medium further comprises one or more additional sequences of instructions which, when executed by the one or more processors, cause the one or more processors to perform the step of authenticating the user using the PIN.

19. The computer-readable medium as recited in claim 16, wherein the first order data further comprises user identification data that identifies a user, wherein the computer-readable medium further comprises one or more additional sequences of instructions which, when executed by the one or more processors, cause the one or more processors to perform the step of retrieving, based upon the user identification data, order fulfillment information associated with the user, and wherein the step of generating, based upon the first order data and the at least one data item, second order data that includes the minimum set of data required by the one merchant to completely process the order includes generating, based upon the first order data, the at least one data item and the order fulfillment information, second order data that includes the minimum set of data required by the one merchant to completely process the order.

20. The computer-readable medium as recited in claim 19, wherein the order fulfillment information includes billing information for the user, wherein the step of retrieving order fulfillment information associated with the user includes retrieving billing information for the user, and wherein the step of generating, based upon the first order data, the at least one data item and the order fulfillment information, second order data that includes the minimum set of data required by the one merchant to completely process the order includes generating, based upon the first order data, the at least one data item and the billing information, second order data that includes the minimum set of data required by the one merchant to completely process the order.

21. The computer-readable medium as recited in claim 19, wherein the order fulfillment information includes shipping information for the user, and wherein the step of retrieving order fulfillment information associated with the user includes retrieving shipping information for the user.

22. The computer-readable medium as recited in claim 16, wherein the step of generating, based upon the first order data and the at least one data item, second order data that includes the minimum set of data required by the one merchant to completely process the order includes generating, based upon the first order data and the at least one data item, second order data that includes the minimum set of data in a format required by the one merchant to completely process the order.

23. The computer-readable medium as recited in claim 16, further comprising one or more additional sequences of instructions which, when executed by the one ore more processors, cause the one or more processors to perform the steps of:

retrieving product information based upon the first order data, and the step of generating, based upon the first order data and the at least one data item, second order data that includes the minimum set of data required by the one merchant to completely process the order includes generating, based upon the first order data, the at least one, data item and the product information, second order data that includes the minimum set of data required by the one merchant to completely process the order.

24. The computer-readable medium as recited in claim 16, further comprising one or more additional sequences of instructions which, when executed by the one or more processors, cause the one or more processors to perform the steps of:

determining that the one merchant cannot completely process the order; and providing the second order data to a second one of said plurality of merchants for processing.

25. The computer-readable medium as recited in claim 16, wherein the order is for a particular product or service, wherein the order cannot be completely processed by the one merchant, and wherein the step of generating, based upon the first order data and the at least one data item, the second order data includes generating, based upon the first order data and the at least one data item, second order data that includes the minimum set of data required by the one merchant to completely process an order for a second product or service.

26. The computer-readable medium as recited in claim 16, wherein the first order data and the device identification data are received from the mobile device over a wireless communications link.

27. The computer-readable medium as recited in claim 16, wherein the mobile device is a mobile telephone and wherein the device identification data is a telephone number for the mobile telephone.

28. The computer-readable medium as recited in claim 16, wherein the mobile device is a personal digital assistant.

29. The computer-readable medium as recited in claim 16, wherein the mobile device is a mobile personal computer.

30. The computer-readable medium as recited in claim 16, wherein the mobile device receives product and service information according to the type of mobile device and the communications protocol used by the mobile device as determined by the device identification data.

31. A computer system for processing electronic orders comprising:

one or more processors; and a memory communicatively coupled to the one or more processors, wherein the memory includes one or more sequences of one more instructions which, when executed by the one or more processors, cause the one or more processors to perform the steps of:

receiving, at an intermediary disposed between and separate from a mobile device and a plurality of merchants, first order data for an order and device identification data from the mobile device, wherein the first order data includes data regarding one or more products or services that a user associated with the mobile device desires to purchase and data regarding one of the plurality of merchants from which the user desires to purchase the one or more products or services, yet includes less than a minimum set of data required by the one merchant to completely process the order, and wherein the device identification data identifies the mobile device;

storing, at an intermediary, information that specifies the minimum set of data required by at least the one of merchant to completely process an order;

comparing, by the intermediary, first order data to the minimum set of data required by the one merchant to completely process the order;

retrieving, by the intermediary, based upon the comparison and the device identification data, at least one data item that is not included in the first order data, but that is needed to have the minimum set of data required by the one merchant to completely process the order;

generating, by the intermediary, based upon the first order data and the at least one data item, second order data that includes the minimum set of data required by the one merchant to completely process the order; and providing the second order data to the one merchant for processing.

32. The computer system as recited in claim 31, wherein the memory includes one or more additional sequences of one or more instructions which, when executed by the one or more processors, cause the one or more processors to perform the steps of:

receiving user authentication data for a user associated with the mobile user device, and authenticating the user using the user authentication data.

33. The computer system as recited in claim 32, wherein the user authentication data includes a Personal Identification Number (PIN) for the user and wherein the memory includes one or more additional sequences of one or more instructions which, when executed by the one or more processors, cause the one or more processors to perform the step of authenticating the user using the PIN.

34. The computer system as recited in claim 31, wherein the first order data further comprises user identification data that identifies a user, wherein the memory includes one or more additional sequences of one or more instructions which, when executed by the one or more processors, cause the one or more processors to perform the step of retrieving, based upon the user identification data, order fulfillment information associated with the user and wherein the step of generating, based upon the first order data and the at least one data item, second order data that includes the minimum set of data required by the one merchant to completely process the order includes generating, based upon the first order data, the at least one data item and the order fulfillment information, second order data that includes the minimum set of data required by the one merchant to completely process the order.

35. The computer system as recited in claim 34, wherein: the order fulfillment information includes billing information for the user, wherein the step of retrieving order fulfillment information associated with the user includes retrieving billing information for the user and wherein the step of generating, based upon the first order data, the at least one data item and the order fulfillment information, second order data that includes the minimum set of data required by the one merchant to completely process the order includes generating, based upon the first order data, the at least one data item and the billing information, second order data that includes the minimum set of data required by the one merchant to completely process the order.

36. The computer system as recited in claim 34, wherein the order fulfillment information includes shipping information for the user and wherein the step of retrieving order fulfillment information associated with the user includes retrieving shipping information for the user.

37. The computer system as recited in claim 31, wherein the step of generating, based upon the first order data and the at feast one data item, second order data that includes the minimum set of data required by the one merchant to completely process the order includes generating, based upon the first order data and the at least one data item, second order data that includes the minimum set of data in a format required by the one merchant to completely process the order.

38. The computer system as recited in claim 31, wherein the memory includes one or more additional sequences of one or more instructions which, when executed by the one or more processors, cause the one or more processors to perform the step of retrieving product information based upon the first order data, and wherein the step of generating, based upon the first order data and the at least one data item, second order data that includes the minimum set of data required by the one merchant to completely process the order includes generating, based upon the first order data, the at least one data item and the product information, second order data that includes the minimum set of data required by the one merchant to completely process the order.

39. The computer system as recited in claim 31, wherein the memory further includes one or more additional sequences of one or more instructions which, when executed by the one or more processors, cause the one or more processors to perform the steps of:

determining that the one merchant cannot completely process the order, and providing the second order data to a second one of said plurality of merchants for processing.

40. The computer system as recited in claim 31, wherein the order is for a particular product or service, wherein the order cannot be completely processed by the merchant, and wherein the step of generating, based upon the first order data and the at least one data item, the second order data includes generating, based upon the first order data and the at least one data item, second order data that includes the minimum set of data required by the one merchant to completely process an order for a second product or service.

41. The computer system as recited in claim 31, wherein the first order data and the device identification data are received from the mobile device over a wireless communications link.

42. The computer system as recited in claim 31, wherein the mobile device is a mobile telephone and the device identification data is a telephone number for the mobile telephone.

43. The computer system as recited in claim 31, wherein the mobile device is a personal digital assistant.

44. The computer system as recited in claim 31, wherein the mobile device is a mobile personal computer.

45. The computer system as recited in claim 31, wherein the mobile device receives product and service information according to the type of mobile device and the communications protocol used by the mobile device as determined by the device identification data.

46. An apparatus for processing electronic orders comprising: an information repository; and
    a transaction facilitator disposed between and separate from a mobile device and a plurality of merchants and communicatively coupled to the information repository, wherein the transaction facilitator is configured to:
    receive from the mobile device over a wireless communications link first order data for an order and device identification data, wherein the first order data comprises information relating to one or more products or services that a user associated with the mobile device desires to purchase and information relating to one of the plurality of merchants from which the user desires to purchase the one or more products or services, yet includes less than a minimum set of data required by the one merchant to completely process the order and the device identification data identifies the mobile device;
    store, at an intermediary, information that specifies a minimum set of data required by at least the one merchant to completely process an order;
    compare, by the intermediary, first order data to the minimum set of data required by the one merchant to completely process the order;
    retrieve from the information repository, based upon the comparison and the device identification data, at least one data item that is not contained in the first order data, but that is needed to have the minimum set of data required by the one merchant to completely process the order;
    generate, based upon the first order data and the at least one data item, second order data that includes the minimum set of data required by the one merchant to completely process the order, and
    provide the second order data to the one merchant for processing.

47. The apparatus as recited in claim 46, wherein the one merchant is configured with a web-based order interface, and
    wherein the second order data is provided directly to the one merchant, circumventing the web-based order interface.

48. The apparatus as recited in claim 46, wherein the mobile device receives product and service information according to the type of mobile device and the communications protocol used by the mobile device as determined by the device identification data.

* * * * *